(12) United States Patent
Hayashi

(10) Patent No.: US 9,256,116 B2
(45) Date of Patent: Feb. 9, 2016

(54) STEREOSCOPIC IMAGING DEVICE, IMAGE REPRODUCING DEVICE, AND EDITING SOFTWARE

(75) Inventor: Junji Hayashi, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 737 days.

(21) Appl. No.: 13/638,555

(22) PCT Filed: Nov. 9, 2010

(86) PCT No.: PCT/JP2010/069913
§ 371 (c)(1),
(2), (4) Date: Nov. 2, 2012

(87) PCT Pub. No.: WO2011/121837
PCT Pub. Date: Oct. 6, 2011

(65) Prior Publication Data
US 2013/0038699 A1 Feb. 14, 2013

(30) Foreign Application Priority Data

Mar. 29, 2010 (JP) ................................. 2010-075750

(51) Int. Cl.
*H04N 13/02* (2006.01)
*G03B 35/10* (2006.01)
*H04N 13/00* (2006.01)
*H04N 5/357* (2011.01)
*H04N 13/04* (2006.01)

(52) U.S. Cl.
CPC ............ *G03B 35/10* (2013.01); *H04N 13/0018* (2013.01); *H04N 13/0239* (2013.01); *H04N 5/3572* (2013.01); *H04N 13/0022* (2013.01); *H04N 13/0066* (2013.01); *H04N 13/0246* (2013.01); *H04N 13/0285* (2013.01); *H04N 13/0402* (2013.01)

(58) Field of Classification Search
CPC ........................................................ G03B 35/10
USPC ........................................................ 348/47
See application file for complete search history.

(56) References Cited

U.S. PATENT DOCUMENTS

| 2003/0223007 A1 | 12/2003 | Takane |
| 2007/0132859 A1 | 6/2007 | Inoue et al. |
| 2008/0131107 A1 | 6/2008 | Ueno |
| 2009/0304301 A1 | 12/2009 | Hattori |

FOREIGN PATENT DOCUMENTS

| JP | 8-317424 A | 11/1996 |
| JP | 2002-247593 A | 8/2002 |
| JP | 2004-7304 A | 1/2004 |
| JP | 2004-126905 A | 4/2004 |
| JP | 2004-128565 A | 4/2004 |
| JP | 2008-131551 A | 6/2008 |
| JP | 2008-141518 A | 6/2008 |
| JP | 2009-302657 A | 12/2009 |

*Primary Examiner* — Yulin Sun
(74) *Attorney, Agent, or Firm* — Birch, Stewart, Kolasch & Birch, LLP.

(57) ABSTRACT

A recording unit recording the plurality of time-series parallax images outputted from the plurality of imaging units on a recording medium when the moving image is photographed, reading out the first and second information from the storage unit, and recording the first information and the second information read out from the storage unit on the recording medium in association with the plurality of parallax images.

17 Claims, 10 Drawing Sheets

FIG.4

| ZOOM POSITION | LEFT LENS | | | RIGHT LENS | | |
|---|---|---|---|---|---|---|
| | CUTOUT CENTER | CUTOUT SIZE | LENS DISTORTION CORRECTION PARAMETER | CUTOUT CENTER | CUTOUT SIZE | LENS DISTORTION CORRECTION PARAMETER |
| ZP1 | (Lx1, Ly1) | (LH1, LV1) | $La1 \cdot X^6 + Lb1 \cdot X^5 + \ldots Lf1 \cdot X + Lg1$ | (Rx1, Ry1) | (RH1, RV1) | $Ra1 \cdot X^6 + Rb1 \cdot X^5 + \ldots Rf1 \cdot X + Rg1$ |
| 2 | (Lx2, Ly2) | (LH2, LV2) | $La2 \cdot X^6 + Lb2 \cdot X^5 + \ldots Lf2 \cdot X + Lg2$ | (Rx2, Ry2) | (RH2, RV2) | $Ra2 \cdot X^6 + Rb2 \cdot X^5 + \ldots Rf2 \cdot X + Rg2$ |
| 3 | (Lx3, Ly3) | (LH3, LV3) | $La3 \cdot X^6 + Lb3 \cdot X^5 + \ldots Lf3 \cdot X + Lg3$ | (Rx3, Ry3) | (RH3, RV3) | $Ra3 \cdot X^6 + Rb3 \cdot X^5 + \ldots Rf3 \cdot X + Rg3$ |
| 4 | (Lx4, Ly4) | (LH4, LV4) | $La4 \cdot X^6 + Lb4 \cdot X^5 + \ldots Lf4 \cdot X + Lg4$ | (Rx4, Ry4) | (RH4, RV4) | $Ra4 \cdot X^6 + Rb4 \cdot X^5 + \ldots Rf4 \cdot X + Rg4$ |
| 5 | (Lx5, Ly5) | (LH5, LV5) | $La5 \cdot X^6 + Lb5 \cdot X^5 + \ldots Lf5 \cdot X + Lg5$ | (Rx5, Ry5) | (RH5, RV5) | $Ra5 \cdot X^6 + Rb5 \cdot X^5 + \ldots Rf5 \cdot X + Rg5$ |

FIG.7

| START CODE |
|---|
| TAG<br>• PHOTOGRAPHING INFORMATION ON PHOTOGRAPHING FOR ACQUIRING AN IMAGE FILE (INFORMATION INDICATING THE STATE OF LIGHT EMISSION OF A FLASH, INFORMATION INDICATING THE STATE OF A DIAPHRAGM, INFORMATION INDICATING PHOTOGRAPHY DATE AND TIME, INFORMATION INDICATING A FOCUS AREA, ETC.), OR INFORMATION INDICATING PHOTOGRAPHING CONDITIONS SET BY A DIGITAL CAMERA AT A PHOTOGRAPHING TIME (MANUAL PHOTOGRAPHING, AUTOMATIC PHOTOGRAPHING, PROGRAMMED PHOTOGRAPHING, MACRO PHOTOGRAPHING, MOVING OBJECT PHOTOGRAPHING, NIGHT PHOTOGRAPHING, HUMAN PHOTOGRAPHING, ETC.), ETC.) |
| • TABLE: ZOOM POSITION, CUTOUT CENTER, CUTOUT SIZE, LENS DISTORTION CORRECTION PARAMETER |
| • THUMBNAIL PARALLAX ADJUSTMENT VALUE (HORIZONTAL, VERTICAL) LEFT |
| • THUMBNAIL PARALLAX ADJUSTMENT VALUE (HORIZONTAL, VERTICAL) RIGHT |
| • THUMBNAIL IMAGE LEFT |
| • THUMBNAIL IMAGE RIGHT |

T = 0 SEC.

| PACKET OF INFORMATION ABOUT PARALLAX ADJUSTMENT VALUE (HORIZONTAL, VERTICAL) AND ZOOM POSITION OF LEFT MOVING IMAGE (FOR EACH FRAME FOR 1 SEC.) |
|---|
| PACKET OF INFORMATION ABOUT PARALLAX SHIFT VALUE (HORIZONTAL, VERTICAL) AND ZOOM POSITION OF RIGHT MOVING IMAGE (FOR EACH FRAME FOR 1 SEC.) |
| MOVING IMAGE LEFT |
| MOVING IMAGE RIGHT |
| AUDIO (2CH) |

T = 1 SEC.

| PACKET OF INFORMATION ABOUT PARALLAX ADJUSTMENT VALUE (HORIZONTAL, VERTICAL) AND ZOOM POSITION OF LEFT MOVING IMAGE (FOR EACH FRAME FOR 1 SEC.) |
|---|
| PACKET OF INFORMATION ABOUT PARALLAX SHIFT VALUE (HORIZONTAL, VERTICAL) AND ZOOM POSITION OF RIGHT MOVING IMAGE (FOR EACH FRAME FOR 1 SEC.) |
| MOVING IMAGE LEFT |
| MOVING IMAGE RIGHT |
| AUDIO (2CH) |

. . . . . . . . .

T = N SEC.

| PACKET OF INFORMATION ABOUT PARALLAX ADJUSTMENT VALUE (HORIZONTAL, VERTICAL) AND ZOOM POSITION OF LEFT MOVING IMAGE (FOR EACH FRAME FOR 1 SEC.) |
|---|
| PACKET OF INFORMATION ABOUT PARALLAX SHIFT VALUE (HORIZONTAL, VERTICAL) AND ZOOM POSITION OF RIGHT MOVING IMAGE (FOR EACH FRAME FOR 1 SEC.) |
| MOVING IMAGE LEFT |
| MOVING IMAGE RIGHT |
| AUDIO (2CH) |
| END CODE |

STEREOSCOPIC IMAGING DEVICE, IMAGE REPRODUCING DEVICE, AND EDITING SOFTWARE

TECHNICAL FIELD

The present disclosed subject matter relates to a stereoscopic imaging device, and in particular to a stereoscopic imaging device for imaging a plurality of parallax images between which a parallax exists.

BACKGROUND ART

PTL 1 discloses a stereoscopic imaging device provided with a first lens barrel having a CCD for acquiring photographing information for the right eye, a second lens barrel having a CCD for acquiring photographing information for the left eye, a camera detection circuit detecting the respective focal lengths of the first lens barrel and the second lens barrel, a ROM composed of an EEPROM or the like preliminarily storing the amounts of deviation of the centers of the respective optical axes of the first lens barrel and the second lens barrel in the respective focal lengths, and a CPU controlling an image cutout area in at least either one of the pair of right and left CCDs in the respective focal lengths based on an output from the ROM.

PTL 2 discloses an image processor where an approximation formula for coordinate correction based on a lens center is set with respect to a lens property of a stereo camera, and based on this approximation formula, projected coordinates of a target image captured by the camera are corrected.

On the other hand, PTL 3 discloses an image processor where high-definition imaging is performed using a plurality of imaging devices, respective imaging outputs of the imaging devices are converted into a digital image, thereafter the digital image is divided into a plurality of image areas by an image splitting circuit, and the respective image areas are subjected to image processing in parallel, so that high-speed image processing can be performed at a high moving image rate even in the case of a high-definition image.

CITATION LIST

Patent Literature

PTL 1: Japanese Patent Application Laid-Open No. H08-317424
PTL 2: Japanese Patent Application Laid-Open No. 2004-126905
PTL 3: Japanese Patent Application Laid-Open No. 2002-247593

SUMMARY OF INVENTION

Technical Problem

The PTL 1 discloses a technique of producing right and left viewpoint images suitable for stereoscopic vision by correcting an optical axis deviation due to an individual difference between two photographing lenses to change an image cutout area, thereby, and the PTL 2 discloses a technique of correcting an image distortion due to a lens distortion.

When a still image is photographed, the image cutout processing for correcting an optical axis deviation due to an individual difference between two photographing lenses, or the processing for correcting an image distortion due to a lens distortion can be performed after photographing and before writing on a memory card. When a moving image is photographed, however, writing on a memory card must be performed in real time. At the time of moving image photographing when imaging processing, image processing, and compression processing are concentrated, it is difficult to subject a moving image to lens distortion correction processing that is a heavy load, and particularly it is difficult to perform such processing when high-definition (HD) moving images are photographed and recorded at a high frame rate.

The PTL 3 discloses an image processor capable of performing high-speed image processing at a moving image rate on high-definition images, but the image processor described in the PTL 3 processes divided process areas in parallel, and therefore has a complicated circuit configuration and becomes expensive. In addition, the image processing described in the PTL 3 is shading correction, which is neither image distortion correction processing which requires complicated calculation, nor even processing for a three-dimensional (3D) moving image.

The present disclosed subject matter has been made in view of these circumstances, and an object thereof is to provide a stereoscopic imaging device which can photograph and record a high-definition 3D image at a high frame rate and can perform correction processing for aberration of lens distortion that is a heavy load or the like, an image reproducing device of a 3D image photographed by the stereoscopic imaging device, and editing software.

Solution to Problems

In order to achieve the above object, a stereoscopic imaging device according to a first aspect of the present disclosed subject matter includes: a plurality of imaging units each having a photographing optical system and an imaging device which photoelectrically converts an object image focused through the photographing optical system, the plurality of imaging units imaging parallax images having a parallax with respect to each other; a storage unit storing first information indicating a central position of an optical axis of each photographing optical system and a cutout size, or a cutout area centering on a central position of an optical axis of each photographing optical system, and second information indicating an aberration of each photographing optical system; an imaging control unit causing the plurality of imaging units to output a plurality of time-series parallax images forming a stereoscopic moving image; and a recording unit recording the plurality of time-series parallax images outputted from the plurality of imaging units on a recording medium when a moving image is photographed, and recording the first information and the second information read out from the storage unit on the recording medium in association with the plurality of parallax images.

The first information is information for correcting the amounts of deviation of the optical centers of the respective photographing optical systems, and the first information is acquired by inspecting the respective photographing optical systems of the plurality of imaging units before shipment of a product, and is information indicating the central positions of the optical axes of the respective photographing optical systems and the cutout sizes, or information indicating the cutout areas centering on the central positions of the optical axes of the respective photographing optical systems (for example, the coordinate positions of opposing corners of the cutout area). In addition, the second information is also information acquired similarly by inspecting the respective photographing optical systems of the plurality of imaging units before shipment of the product, and is information indicating aberrations, such as distortions and chromatic aberrations of the respective photographing optical systems. These pieces of first and second information are stored in advance in a nonvolatile storage unit, such as an EEPROM.

The stereoscopic imaging device according to the first aspect records the first information and the second information in association with a plurality of time-series parallax images photographed as a moving image (a 3D moving image), and does not perform heavy processing such as lens distortion correction during photographing a moving image so that high-definition 3D moving image can be photographed and recorded at high frame rate.

According to a second aspect of the present disclosed subject matter, in the stereoscopic imaging device according to the first aspect, the first information is information on the parallax images before the aberrations of the photographing optical systems are corrected or the parallax images after the aberrations have been corrected. That is, the first information may be information on the assumption of parallax images before correcting aberrations of the photographing optical systems (parallax images which includes a aberration), or may be information on the assumption that parallax images after correcting aberrations of the photographing optical systems (parallax images which do not include an aberration).

According to a third aspect of the present disclosed subject matter, the stereoscopic imaging device according to the first or second aspect further includes a parallax amount adjustment unit adjusting parallax amounts among the plurality of parallax images outputted from the plurality of imaging units, wherein the recording unit records third information indicating parallax amounts adjusted by the parallax amount adjustment unit on the recording medium in association with the plurality of parallax images. The third information is information indicating the lateral deviation amounts among the plurality of parallax images, and information for adjusting the levels of parallaxes.

According to a fourth aspect of the present disclosed subject matter, in the stereoscopic imaging device according to any one of the first to third aspects, the photographing optical system is a zoom lens, the storage unit stores the first information and the second information for respective zoom positions of the zoom lens, and the recording unit records on the recording medium in association with the plurality of parallax images all information of the first information and the second information for the respective zoom positions stored in the storage unit and information indicating a time-series zoom position of the zoom lens when a moving image is photographed, or time-series pieces of the first information and the second information read out from the storage unit based on the zoom position of the zoom lens when a moving image is photographed.

It is difficult to mechanically adjust deviations of the centers of the optical axes of a plurality of photographing optical systems, and in particular, adjusting the deviation of the center of the optical axis within all zoom range of a zoom lens is limited. In addition, aberrations of the plurality of photographing optical systems vary with their zoom positions. Therefore, the storage unit stores in advance the first information and the second information for the respective zoom positions of the zoom lens, and records all information of the first information and the second information for the respective zoom positions of the zoom lens, and information indicating time-series zoom positions of the zoom lens in association with a 3D moving image when a moving image is photographed, or records time-series pieces of the first information and the second information read out from the storage unit based on the zoom position of the zoom lens in association with a 3D moving image when a moving image is photographed.

According to a fifth aspect of the present disclosed subject matter, the stereoscopic imaging device according to the first aspect, the second aspect, or the fourth aspect further includes a readout unit reading out the plurality of time-series parallax images, and the first information and the second information from the recording medium; an image processing unit cutting out the plurality of readout time-series parallax images for stereoscopic display based on the readout first information, and creating a plurality of time-series parallax images after aberration correction based on the readout second information; and an output unit outputting the plurality of time-series parallax images created by the image processing unit to a stereoscopic display unit in the stereoscopic imaging device or an external stereoscopic display unit.

The stereoscopic imaging device according to the fifth aspect reads out the plurality of time-series parallax images, and the first information and the second information from the recording medium at a reproducing time, cuts out parallax images for stereoscopic display from the plurality of readout time-series parallax images based on the first information so as to correct deviations of the optical axes of the plurality of parallax images, creates a plurality of time-series parallax images after aberration correction based on the second information, and outputs the plurality of time-series parallax images (a 3D moving image) whose optical axis deviations and aberrations have been corrected to a stereoscopic display unit in the stereoscopic imaging device or an external stereoscopic display unit.

It should be noted that at the reproducing time of a moving image, there is no compression recording processing requiring more time than moving image photographing processing or expansion processing at a photographing time of a moving image, and therefore a 3D moving image can be displayed while processing for correcting the aberrations or the like is being performed.

According to a sixth aspect of the present disclosed subject matter, the stereoscopic imaging device according to the third aspect further includes: a readout unit reading out the plurality of time-series parallax images, and the first information, the second information, and the third information from the recording medium; an image processing unit cutting out the plurality of readout time-series parallax images for stereoscopic display based on the readout first information and third information, and creating a plurality of time-series parallax images after aberration correction based on the readout second information; and an output unit outputting the plurality of time-series parallax images created by the image processing unit to a stereoscopic display unit in the stereoscopic imaging device or an external stereoscopic display unit.

The stereoscopic imaging device according to the sixth aspect is different from the stereoscopic imaging device according to the fifth aspect in that the stereoscopic imaging device according to the sixth aspect adjusts the parallax amount of a 3D moving image based on the third information and outputs the 3D moving image.

According to a seventh aspect of the present disclosed subject matter, the stereoscopic imaging device according to the third aspect further includes: a readout unit reading out the plurality of time-series parallax images and the first information, the second information, and the third information from the recording medium; an image processing unit cutting out the plurality of readout time-series parallax images for stereoscopic display based on the readout first information, and creating a plurality of time-series parallax images after aberration correction based on the readout second information; and an output unit shifting the plurality of time-series parallax images created by the image processing unit based on the third information and outputting the plurality of shifted time-series parallax images to a stereoscopic display unit in the stereoscopic imaging device or an external stereoscopic display unit.

The stereoscopic imaging device according to the seventh aspect is different from the stereoscopic imaging device according to the sixth aspect in that the stereoscopic imaging device according to the seventh aspect uses the third information to shift the plurality of parallax images (uses the third information as offset amounts).

According to an eighth aspect of the present disclosed subject matter, the stereoscopic imaging device according to any one of the fifth to seventh aspects further includes, instead of the outputting unit, or in addition to the outputting unit, a recording unit recording, on the recording medium, the plurality of time-series parallax images created by the image processing unit.

That is, the stereoscopic imaging device according to the eighth aspect records on the recording medium a processed 3D moving image whose aberration or the like has been corrected by the image processing unit. At this time, a processed 3D moving image may be recorded instead of an unprocessed 3D moving image, or a processed 3D moving image may be recorded separately from an unprocessed 3D moving image.

An image reproducing device according to a ninth aspect of the present disclosed subject matter includes: a readout unit reading out the plurality of time-series parallax images and the first information and the second information from the recording medium recorded by the stereoscopic imaging device according to the first, second, or fourth aspect; an image processing unit cutting out the plurality of readout time-series parallax images for stereoscopic display based on the readout first information, and creating a plurality of time-series parallax images after aberration correction based on the readout second information; and a stereoscopic display unit displaying a stereoscopic moving image based on the plurality of time-series parallax images created by the image processing unit.

An image reproducing device according to a tenth aspect of the present disclosed subject matter includes: a readout unit reading out the plurality of time-series parallax images, and the first information, the second information, and the third information from the recording medium recorded by the stereoscopic imaging device according to the third aspect; an image processing unit cutting out the plurality of readout time-series parallax images for stereoscopic display based on the readout first information and third information, and creating a plurality of time-series parallax images after aberration correction based on the readout second information; and a stereoscopic display unit displaying a stereoscopic moving image based on the plurality of time-series parallax images created by the image processing unit.

An image reproducing device according to an eleventh aspect of the present disclosed subject matter includes: a readout unit reading out the plurality of time-series parallax images and the first information, the second information, and the third information from the recording medium recorded by the stereoscopic imaging device according to the third aspect; an image processing unit cutting out the plurality of readout time-series parallax images for stereoscopic display based on the readout first information, and creating a plurality of time-series parallax images after aberration correction based on the readout second information; and a stereoscopic display unit shifting the plurality of time-series parallax images created by the image processing unit based on the third information, thereby displaying a stereoscopic moving image.

That is, the image reproducing device according to the ninth, tenth, or eleventh aspect reads out from the recording medium an unprocessed 3D moving image which has not been subjected to processing for correcting an aberration or the like, and the first and second information or the first, second, and third information recorded in association with the unprocessed 3D moving image, and corrects the unprocessed 3D moving image and outputs the same to the stereoscopic display unit, so that a 3D moving image whose optical axis deviation, lens distortion, or the like has been corrected can be reproduced.

Editing software according to a twelfth aspect of the present disclosed subject matter causes a computer to realize: a readout function of reading out the plurality of time-series parallax images and the first information and the second information from the recording medium recorded by the stereoscopic imaging device according to the first, second, or fourth aspect; an image processing function of cutting out the plurality of readout time-series parallax images for stereoscopic display based on the readout first information, and creating a plurality of time-series parallax images after aberration correction based on the readout second information; and a recording function of recording the plurality of created time-series parallax images on the recording medium.

Editing software according to a thirteenth aspect of the present disclosed subject matter causes a computer to realize: a readout function of reading out the plurality of time-series parallax images, and the first information, the second information, and the third information from the recording medium recorded by the stereoscopic imaging device according to the third aspect; an image processing function of cutting out the plurality of readout time-series parallax images for stereoscopic display based on the readout first information and third information, and creating a plurality of time-series parallax images after aberration correction based on the readout second information; and a recording function of recording the plurality of created time-series parallax images on the recording medium.

Editing software according to a fourteenth aspect of the present disclosed subject matter makes a computer realizing: a readout function of reading out the plurality of time-series parallax images, and the first information, the second information, and the third information from the recording medium recorded by the stereoscopic imaging device according to the third aspect; an image processing function of cutting out the plurality of readout time-series parallax images for stereoscopic display based on the readout first information, and creating a plurality of time-series parallax images after aberration correction based on the readout second information; and an outputting function of shifting the plurality of time-series parallax images created by the image processing unit based on the third information and outputting the plurality of shifted time-series parallax images to a stereoscopic display unit in the stereoscopic imaging device or an external stereoscopic display unit.

Thereby, it is made unnecessary to perform the processing for correcting an optical axis deviation, a lens distortion, and the like when a 3D moving image is reproduced, the reproduction processing can be simplified, and in addition, since it is unnecessary to perform the correction processing in real time, a computer can perform the correction processing even if the computer does not have high performance.

Advantageous Effects of Invention

According to the present disclosed subject matter, a 3D moving image which has not been subjected to heavily-loaded processing for correcting an aberration, such as a lens distortion, is recorded on the recording medium, and information required for the correction processing are recorded on a recording medium while the information is associated with the 3D moving image. Therefore, the heavily-loaded correction processing is eliminated when a moving image is photographed, and thus a high-definition 3D moving image can be photographed and recorded at high frame rate.

In addition, when a 3D moving image is reproduced or converted, the processing for correction an optical axis deviation, a lens distortion, and the like is performed based on an unprocessed 3D moving image and information for the correction processing recorded in association with the unprocessed 3D moving image read out from the recording medium. This makes it possible to reproduce or convert a high-quality 3D moving image suitable for stereoscopic vision.

BRIEF DESCRIPTION OF DRAWINGS

FIG. 4 is a table showing an example of camera's unique correction parameters obtained by pre-shipment inspection;

FIG. 7 is a table showing an example of a file structure of a recording file recording a 3D moving image;

DESCRIPTION OF EMBODIMENTS

Hereinafter, embodiments of a stereoscopic imaging device according to the present disclosed subject matter will be described with reference to the accompanying drawings.

[External Appearance of Stereoscopic Imaging Device]

Figure 1A:
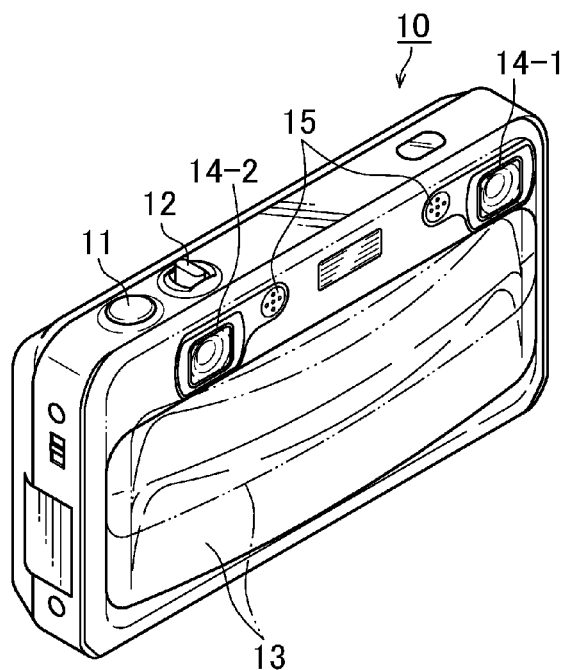
FIG. 1A is a view (Part 1) showing the appearance of a stereoscopic imaging device according to the present disclosed subject matter.
Figure 1B:
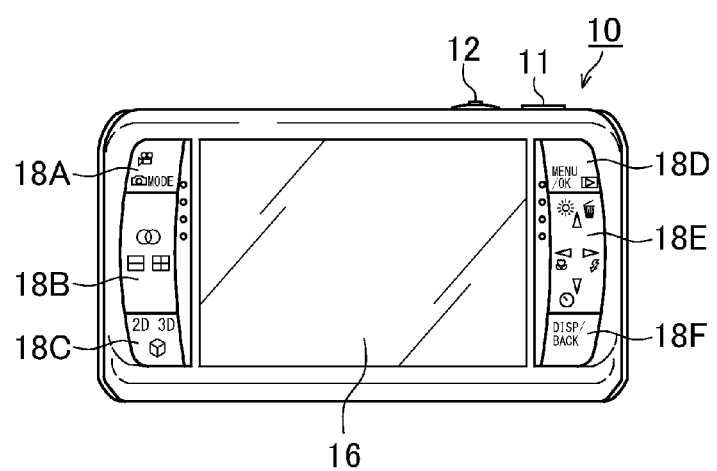
FIG. 1B is a view (Part 2) showing the appearance of a stereoscopic imaging device according to the present disclosed subject matter.

FIGS. 1A and 1B are views showing the external appearance of a stereoscopic imaging device according to the present disclosed subject matter, and FIG. 1A is a perspective view thereof as viewed from the front of the stereoscopic imaging device and FIG. 1B is a rear view thereof.

This stereoscopic imaging device (stereo camera) 10 is a digital camera capable of recording and reproducing a 2D/3D still image and a 2D/3D moving image, and as shown in FIGS. 1A and 1B, a shutter button 11 and a zoom button 12 are disposed on an upper face of a thin cuboid-like body of the camera.

A lens barrier 13 having approximately the same width as a lateral width of the camera body is so disposed on a front face of the camera body as to be movable in a vertical direction of the camera body, and by moving this lens barrier 13 vertically between a position indicated by a dashed-two dotted line and a position indicated by a solid line, the respective front faces of a pair of right and left photographing optical system 14-1, 14-2 can be opened and closed simultaneously. It should be noted that dioptric system zoom lenses are used as the photographing optical systems 14-1, 14-2. It should also be noted that a camera power supply can be turned on/off in conjunction with opening/closing action of the lens front faces performed by the lens barrier 13.

As shown in FIG. 1B, a 3D liquid crystal display monitor 16 is disposed in the center of a rear surface of the camera body. The liquid crystal display monitor 16 can display a plurality of parallax images (an image for the right eye and an image for the left eye) through a parallax barrier as directional images having a predetermined directionality. It should be noted that monitors applicable for the 3D liquid crystal display monitor 16 include a monitor using a lenticular lens, a monitor that is combined with dedicated glasses worn by a viewer, such as polarization glasses or liquid crystal shutter glasses, so that an image for the right eye and an image for the left eye can be viewed separately, and the like.

Various operation switches are disposed on the right and left side of the liquid crystal display monitor 16. An operation switch 18A is a selector switch for switching between a still image and a moving image, an operation switch 18B is a parallax adjustment switch for adjusting a parallax amount between an image for the right eye and an image for the left eye, and an operation switch 18C is a selector switch for switching between 2D photographing and 3D photographing. In addition, an operation switch 18D is a seesaw key doubling as a MENU/OK button and a reproduction button, an operation switch 18E is a multi-functional cross key, and an operation switch 18F is a DISP/BACK key.

The MENU/OK button is an operation switch provided with both a function as a menu button for issuing an instruction to display a menu on a screen of the liquid crystal display monitor 16, and a function as an OK button for issuing an instruction to determine or execute a selected content or the like. The reproduction button is a button for switching from a photographing mode to a reproduction mode. The cross key is an operation switch for inputting four-directional instructions: up and down, and right and left, and assigned with a macro button, a flash button, a self timer button, and the like, and in addition, when a menu has been selected, the cross key functions as a switch (cursor movement operation unit) for selecting an item from the menu screen or issuing an instruction to select one of various setting items from each menu. Further, left/right key of the cross key functions a frame feeding (forward and backward) key in a reproduction mode. The DISP/BACK key is used to perform switching between display aspects of the liquid crystal display monitor 16, to cancel an instructed content on a menu screen, to return to the last operation state, or the like.

It should be noted that in FIG. 1A, the reference sign 15 denotes stereo microphones.

[Internal Configuration of the Stereoscopic Imaging Device]

Figure 2:
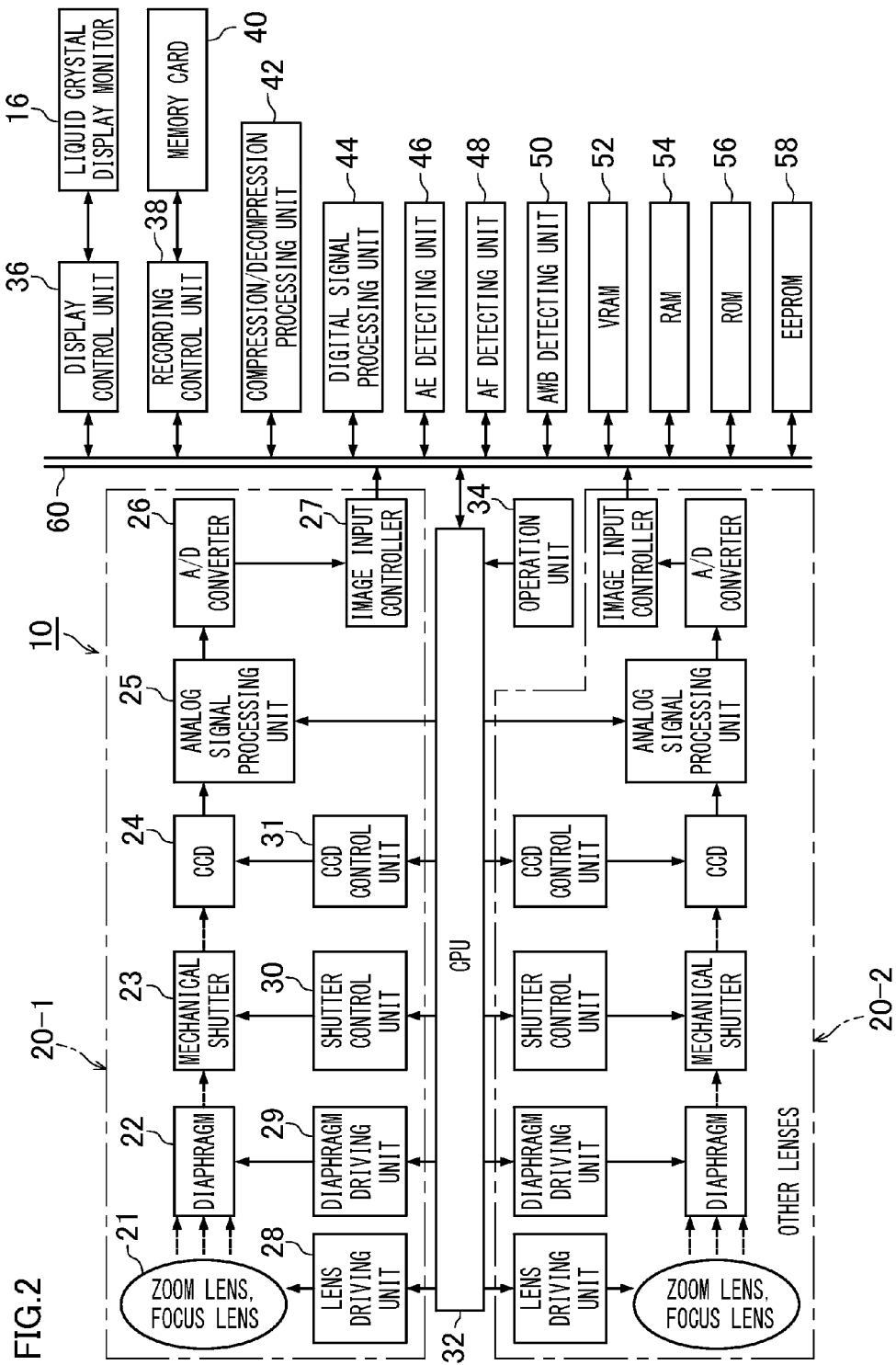
FIG. 2 is a block diagram showing an embodiment of the stereoscopic imaging device according to the present disclosed subject matter.

FIG. 2 is a block diagram showing an embodiment of the stereoscopic imaging device 10.

As shown in FIG. 2, this stereoscopic imaging device 10 is mainly composed of a plurality of imaging units 20-1, 20-2, a central processing unit (CPU) 32, the shutter button 11 and the zoom button 12 which are described above, an operation unit 34 including various operation switches, a display control unit 36, the liquid crystal display monitor 16, a recording control unit 38, a compression/decompression processing unit 42, a digital signal processing unit 44, an AE (automatic exposure) detecting unit 46, an AF (auto-focus) detecting portion 48, an AWB (automatic white balance) detecting unit 50, a VRAM (video RAM) 52, a RAM 54, a ROM 56, an EEPROM (electrically erasable and programmable ROM) 58, and the like. It should be noted that the imaging units 20-1, 20-2 image two parallax images: an image for the left eye and an image for the right eye having a parallax with respect to each other, but three or more imaging units 20 may be provided.

The imaging unit 20-1 imaging an image for the left eye is provided with an optical unit composed of a photographing optical system composed of a prism (not shown), a focus lens, and a zoom lens 21, a diaphragm 22, and a mechanical shutter 23, a solid-state imaging device (CCD) 24, an analog signal processing unit 25, an A/D converter 26, an image input controller 27, a lens driving unit 28 driving the optical unit, a diaphragm driving unit 29, a shutter control unit 30, and a CCD control unit 31 controlling the CCD 24. It should be noted that since the imaging 20-2 imaging an image for the right eye has the same configuration as the imaging unit 20-1 imaging an image for the left eye, concrete description of the imaging unit 20-2 is omitted.

The CPU 32 controls the whole operation of the camera according to a predetermined control program in an integrating fashion based on an input from the operation unit 34. It should be noted that the ROM 56 stores a control program executed by the CPU 32 and various data or the like required for the control, and the EEPROM 58 stores various information showing a detecting result of a pre-shipment product inspection, for example, pixel defect information on the CCD 24, or correction parameters or tables used for image processing or the like. It should be noted that the details of the various information stored in the EEPROM 58 will be described later.

In addition, the VRAM 52 is a memory temporarily storing display image data displayed on the liquid crystal display monitor 16, and the RAM 54 includes an area for computation work of the CPU 32 and an area for temporarily storing image data.

The focus lens and the zoom lens 21 included in the photographing optical system are driven by the lens driving unit 28 to move back and forth along an optical axis. By controlling driving of the lens driving unit 28, the CPU 32 controls the position of the focus lens to performs focus adjustment so as to focus on an object, as well as controlling the zoom position of the zoom lens according to a zoom instruction from the zoom button 12 in the operation unit 34 to change a zoom magnification.

The diaphragm 22 is, for example, composed of an iris diaphragm, and driven to operate by the diaphragm driving unit 29. The CPU 32 controls the size of an aperture (stop value) of the diaphragm 22 through the diaphragm driving unit 29, thereby controlling the amount of light incident on the CCD 24.

The mechanical shutter 23 opens/closes a light path, thereby determining an exposure time at the CCD 24, and blocks unnecessary light from entering the CCD 24 when an image signal from the CCD 24 is read out, thereby preventing the generation of a smear. The CPU 32 outputs a shutter closing signal synchronous with the termination time of exposure corresponding to a shutter speed to the shutter control unit 30, thereby controlling the mechanical shutter 23.

The CCD 24 is composed of a two-dimensional color CCD solid-state imaging device. On a light reception surface of the CCD 24, many photodiodes are two-dimensionally arrayed, and color filters are disposed in a predetermined array in the respective photodiodes.

An optical image of an object focused on the light reception surface of the CCD through the optical unit thus configured is converted by the photodiodes into a signal charge corresponding to the amount of incident light. The signal charges accumulated in the respective photodiodes are sequentially read out from the CCD 24 as voltage signals (image signals) corresponding to the signal charges based on a driving pulse given by the CCD control unit 31 according to an instruction of the CPU 32. The CCD 24 is provided with an electronic shutter function so that the exposure time (shutter speed) is controlled by controlling charge-accumulating times in the photodiodes. It should be noted that the start time of charge accumulation corresponding to the shutter speed is controlled by the electronic shutter, and the termination time of exposure (the termination time of charge accumulation) is controlled by closing the mechanical shutter 23. In this embodiment, the CCD 24 is used as an imaging device, but an imaging device having another configuration, such as a CMOS sensor, can also be used.

Analog signals of R, G, B read out from the CCD 24 are subjected to correlated double sampling (CDS) or amplification by the analog signal processing unit 25, and then converted into digital signals of R, G, B by the A/D converter 26.

The image input controller 27 houses a line buffer having a predetermined capacity so that the image signals of R, G, B (CCDRAW data) A/D-converted by the A/D converter 26 are temporarily accumulated in the line buffer and then stored in the RAM 54 through a bus 60.

The CPU 32 controls the imaging unit 20-1 imaging an image for the left eye and the imaging unit 20-2 imaging an image for the right eye similarly in a 3D photographing mode.

The AE detecting unit 46 calculates object luminance required for AE control based on an image signal taken when the shutter button is half-pressed, and outputs a signal representing the object luminance (photographing EV (exposure value)) to the CPU 32. The CPU 32 sets a shutter speed (an exposure time), a stop value, photographing sensitivity in the plurality of imaging units 20-1, 20-2 according to a predetermined program diagram based on the inputted photographing EV.

The AF detecting unit 48 accumulates absolute values of high-frequency components of the image signal in an AF area taken when the shutter button 11 is half-pressed, and outputs this accumulated value (AF evaluation value) to the CPU 32. The CPU 32 performs focus adjustment to an object (main object) by moving the focus lens from the nearest side toward the infinite side, searching a focal position at which the AF evaluation value detected by the AF detecting unit 48 is maximum, and moving the focus lens to the focal position.

The AWB detecting unit 50 acquires a light source type (color temperature of an object field) automatically based on the image signals of R, G, B acquired at the photographing time, and reads out a corresponding white balance gain from a table storing white balance gains of R, G, B (white balance correction values) set for respective light source types in advance.

The digital signal processing unit 44 includes a first image processing unit, such as a white balance correcting circuit, a tone conversion processing circuit (for example, a gamma correction circuit), a synchronizing circuit by which a spatial deviation between color signals, such as R, G, B, associated with a color filter array of a single plate CCD is interpolated so that the positions of the respective color signals is adjusted, a contour correcting circuit, and a luminance/color-difference signal generating circuit, and the first image processing unit performs first image processing on the image signals of R, G, B (CCDRAW data) stored in the RAM 54. That is, in the digital signal processing unit 44, the CCDRAW data of R, G, B is subjected to white balance correction by multiplying a white balance gain detected by the AWB detecting unit 50, thereafter subjected to predetermined processing, such as tone conversion processing (for example, gamma correction), and thereafter converted into a YC signal composed of a luminance signal (Y signal) and a color-difference signal (Cr, Cb signals). The YC signal which has been processed by the digital signal processing unit 44 is stored in the RAM 54.

In addition, the digital signal processing unit 44 includes a second image processing unit, such as an image cutout processing unit that cuts out images in respective predetermined cutout areas from the right and left viewpoint images to correct deviations of the optical axes of the photographing optical systems of the plurality of imaging units 20-1, 20-2 at a reproducing time of a 3D moving image, and a lens distortion correction processing circuit that corrects lens distortions of the photographing optical systems of the plurality of imaging units 20-1, 20-2, and this second image processing unit performs second image processing on the YC signal processed by the first image processing unit. It should be noted that the details of processing contents of the second image processing unit will be described later.

The compression/decompression image processing unit 42 compresses the YC signal stored in the RAM 54 according to an instruction from the CPU 32 at a recording time on the memory card 40, or decompresses compressed data recorded on the memory card 40 into the YC signal. The recording control unit 38 converts the compressed data compressed by the compression/decompression processing unit 42 into an image file of a predetermined format (for example, a 3D still image into an image file of an MP (multipicture) format), and records the image file on the memory card 40, or reads out the image file from the memory card 40.

The liquid crystal display monitor 16 is used as an image displaying unit for displaying a photographed image, and used as a GUI (graphical user interface) in a time of various settings. In addition, the liquid crystal display monitor 16 is utilized as an electronic finder for confirming the angle of view in a photographing mode. In the case of displaying a 3D image on the liquid crystal display monitor 16, the display control unit 36 causes the liquid crystal display monitor 16 to display an image for the left eye and an image for the right eye stored in the VRAM 52 alternately one pixel by one pixel. Through the parallax barrier provided in the liquid crystal display monitor 16, the right and left images where pixels of the right image and pixels of the left image are alternately arranged one pixel by one pixel are visually recognized separately by the right and left eyes of a user viewing from a predetermined distance. Thereby, stereoscopic vision is made possible.

It should be noted that, though not shown in FIG. 2, this stereoscopic imaging device 10 has a function of recording and reproducing audio information (audio data) acquired by the stereo microphone 15 shown in FIGS. 1A and 1B.

[Operation at a Time of Photographing a 3D Moving Image]

Next, the operation at a time of photographing a 3D moving image of the stereoscopic imaging device 10 according to the present disclosed subject matter will be described with reference to a flowchart shown in FIG. 3.

By using the operation switch 18A shown in FIG. 1B to switch to a moving image photographing mode, and using the operation switch 18C to switch to a 3D photographing mode, a photographing mode in which a 3D moving image is photographed (hereinafter, referred to as "3D moving image photographing mode") can be set.

The stereoscopic imaging device 10 set in the 3D moving image photographing mode can display a 3D live image on the liquid crystal display monitor 16 before recording a moving image or during recording a moving image, so that a user can operate the parallax amount adjustment switch 18B (see FIG. 1B) while watching this 3D live image, thereby adjusting a parallax amount of the 3D moving image (an image for the left eye and an image for the right eye).

That is, by operating the parallax amount adjustment switch 18B in a plus direction or in a minus direction, the parallax amount of the 3D image can be increased or decreased.

Figure 3:
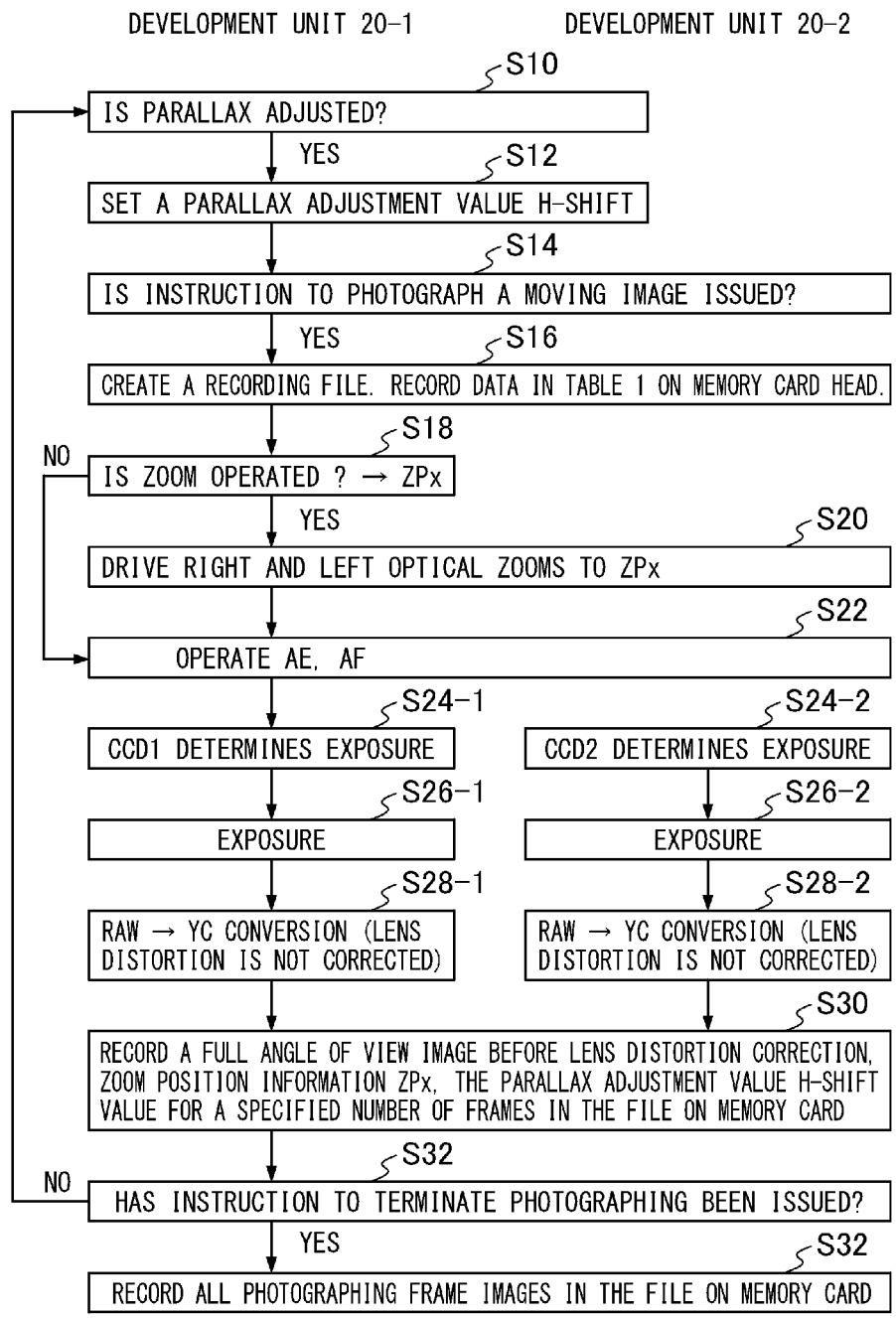
FIG. 3 is a flowchart showing the operation at a photographing time of a 3D moving image of the stereoscopic imaging device according to the present disclosed subject matter.

In FIG. 3, the CPU 32 monitors the operation of the parallax amount adjustment switch 18B, and if the parallax amount adjustment switch 18B is operated (if it is "NO"), the CPU 32 sets a parallax adjustment value H-SHIFT in an internal memory (the RAM 54) (step S10, S12). It should be noted that if the parallax amount adjustment switch 18B is not operated, the parallax adjustment value is set at zero.

Next, the CPU 32 determines whether or not the instruction to photograph a moving image is issued (the shutter button 11 is fully pressed) (step S14). When the shutter button 11 is fully pressed, the CPU 32 first creates a recording file for recording 3D moving images in the memory card 40, and records data in a table shown in FIG. 4 in a header of the file (step S16).

Here, the data in the table shown in FIG. 4 will be described.

Such camera's unique data obtained by pre-shipment inspection as shown in the table in FIG. 4 is stored in the EEPROM 58 shown in FIG. 2. In this embodiment, information (first information) indicating coordinates of cutout centers (optical axis centers) for cutting out an image from an image having a full photographing angle of view of the CCD (hereinafter, referred to as "full image") and cutout sizes (the numbers of horizontal pixels and vertical pixels) for six zoom positions ZP1 to ZP6 of the zoom lens, and information (second information) indicating a lens distortion correction parameter and a calculation formula are stored for each of the right and left photographing optical systems.

Figure 5:
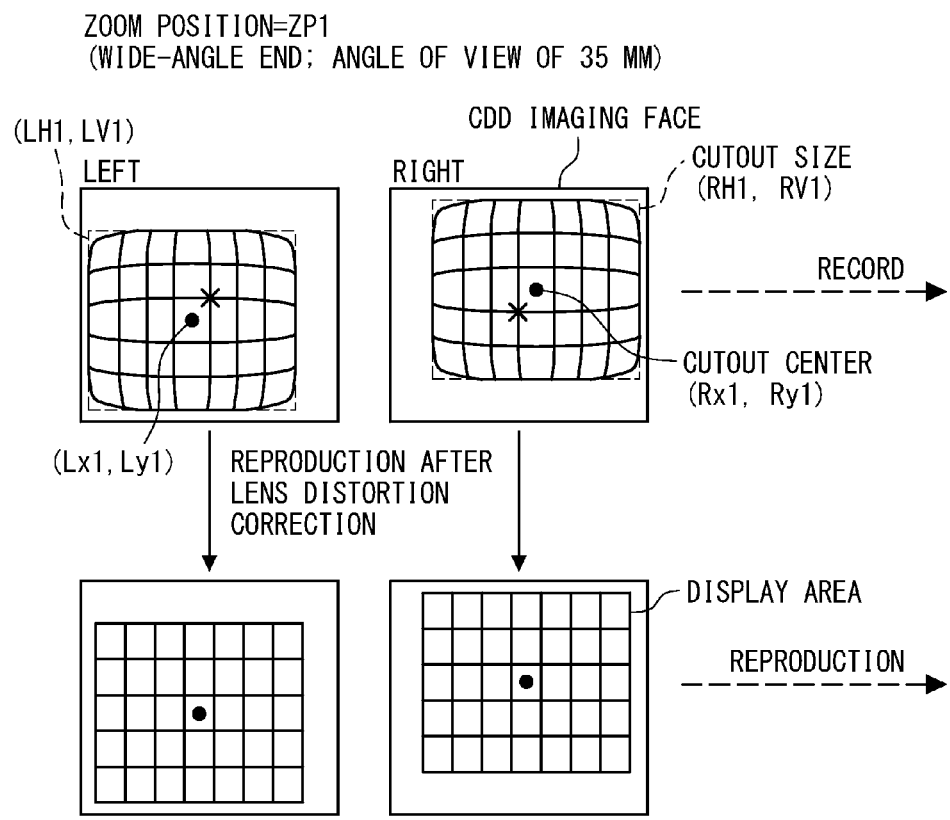
FIG. 5 is a diagram showing a relationship between the right and left full angle of view images and image cutout areas when the zoom position is located at the wide-angle end.
Figure 6:
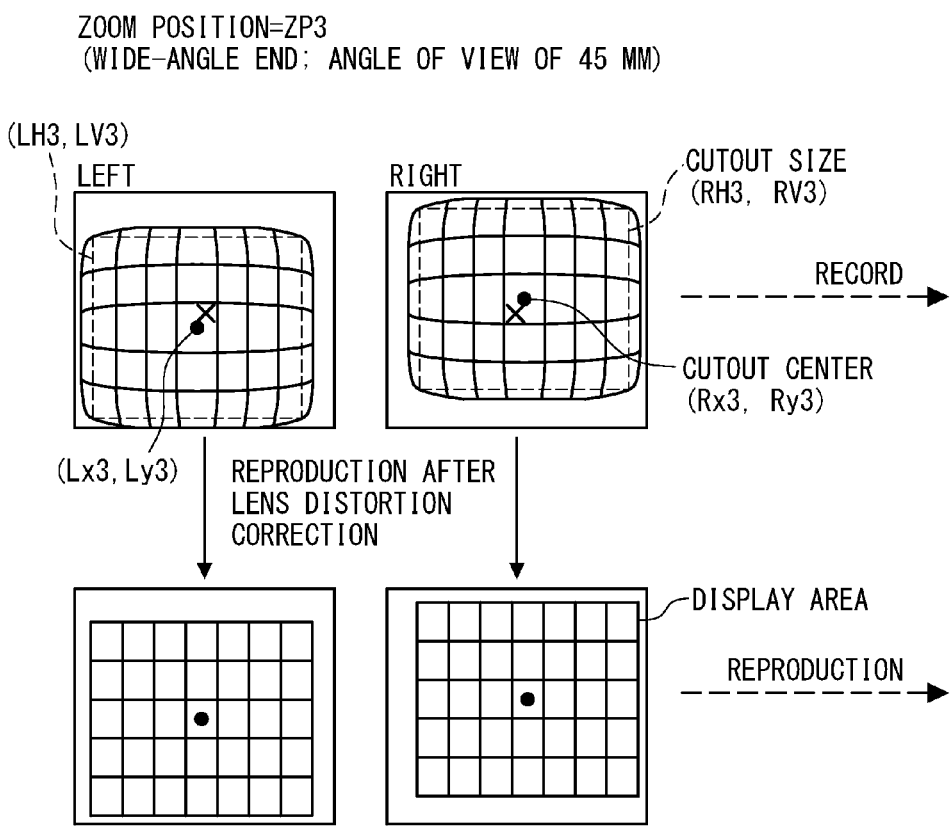
FIG. 6 is a diagram showing a relation between the right and left full angle of view images and image cutout areas when the zoom position has moved to the telephoto end.

FIGS. 5 and 6 show cutout centers and cutout sizes and the like with respect to right and left full images in the zoom position ZP1 (wide-angle end; angle of view of 35 mm) and the zoom position ZP3 (telephoto end; angle of view of 45 mm), respectively.

As shown in FIG. 5, the cutout center (Lx1, Ly1) with respect to a full image for the left eye and the cutout center (Rx1, Ry1) with respect to a full image for the right eye represent the respective centers of the optical axes of the left and right photographing optical systems, and are deviated from the centers (x-marks) of CCD imaging faces.

By cutting out an image with a cutout size (LH1, LV1) centering on the cutout center (Lx1, Ly1) from the full image for the left eye, and similarly cutting out an image with a cutout size (RH1, RV1) centering on the cutout center (Rx1, Ry1) from the full image for the right eye, an image deviation due to the optical axes deviations of the right and left photographing optical systems at the zoom position ZP1 can be corrected, that is, an optical axis deviation can be corrected.

In addition, a lens distortion shown in FIG. 5 shows an example of a barrel distortion, but regarding an image having such a type of lens distortion, the lens distortion can be corrected by inspecting the lens distortion in advance and using information (the second information) for correcting the lens distortion. That is, by using a calculation formula obtained by substituting lens distortion correction parameters into coefficients of respective terms of a calculation formula (a sextic polynomial in the example shown in FIG. 4) for correcting a lens distortion, and relocating pixels to coordinate positions obtained by substituting coordinate values of respective pixels based on the cutout center into the calculation formula, an image whose lens distortion has been corrected can be formed.

It should be noted that higher accurate distortion correction can be performed by the calculation formula having a larger degree, but the amount of calculation increases.

The cutout center (Lx3, Ly3) with respect to a full image for the left eye and the cutout center (Rx3, Ry3) with respect to a full image for the right eye shown in FIG. 6 are different from the cutout center (Lx1, Ly1) and the cutout center (Rx1, Ry1) shown in FIG. 5, respectively. This is because deviations of the centers of the optical axes of the right and left photographing optical systems are different according to the respective zoom positions of the zoom lens.

Therefore, as shown in the table shown in FIG. 4, the information of the cutout centers for the respective zoom positions of the respective zoom lenses of the right and left photographing optical systems is stored.

Further, since the lens distortions of the photographing optical systems vary according to the respective zoom positions of the zoom lens, the lens distortion correction parameters are stored for the zoom positions of the respective zoom lens of the right and left photographing optical systems, as shown in the table in FIG. 4.

It should be noted that the cutout center and the cutout size in this embodiment are values on images whose lens distortion has been corrected. In addition, in a case where the lens properties of the right and left photographing optical systems are identical with each other, a common lens distortion correction parameter may be used to the right and left lenses. Referring back to FIG. 3, the CPU 32 determines whether a zoom operation by the zoom button 12 has been performed (step S18). If the zoom operation has been performed (if it is "YES"), the right and left zoom lenses are moved to the zoom positions ZPx indicated by the zoom operation (step S20). It the zoom operation has not been operated (if it is "NO"), the process proceeds to step S22. It should be noted that the CPU 32 constantly locates the current zoom position ZPx irrespective of whether the zoom operation has been performed.

At step S22, the CPU 32 actuates the AE detecting unit 46 to acquire a photographing EV indicating the brightness of an object, actuates the AF detecting unit 48 to acquire an AF evaluation value indicating the contrast of an object image in the AF area, and drives the right and left focus lenses so as to keep this AF evaluation value at maximum value.

Next, the CPU 32 determines photographing conditions (stop value, shutter speed, photographing sensitivity) in the right and left imaging units 20-1, 20-2 based on the photographing EV acquired at step S32 (steps S24-1, 24-2). It should be noted that in such a case where the performances of the left and right imaging units 20-1, 20-2 are different from each other or different lenses are used, it is necessary to determine photographing conditions individually as described above, but in a case where the left and right imaging units 20-1, 20-2 have the same performance, the same photographing condition may be used in the left and right imaging units 20-1, 20-2.

The CPU 32 performs exposure control on the left and right imaging units 20-1, 20-2 according to the photographing conditions determined in the above manner, and acquires left and right viewpoint images (CCDRAW data) for one frame (steps S26-1, S26-2).

The acquired CCDRAW data is subjected to image processing, such as white balance correction, gamma correction, and YC conversion, by the first image processing unit of the digital signal processing unit 44 (step S28-1, S28-2), and here heavily-loaded processing by the second image processing unit of the digital processing unit 44 (the image cutout processing circuit, the lens distortion processing circuit) is not performed.

The YC signals before lens distortion correction, which have been YC-converted from the CCDRAW data at the steps S28-1, S28-2, are temporarily accumulated in the RAM 54, and when a specified number of frames (for example, 60 frames at a frame rate of 60/second) is reached, an image having a full angle of view before correction, whose YC signal has been compressed, the current zoom position ZPx of the zoom lens associated with the image, and the parallax adjustment value H-SHIFT set at step S12 are stored in the recording file created at step S16 (step S30). It should be noted that as a compression system for a moving image, Motion JPEG, H.264, MPEG4, MPEG4-MVC, or the like can be applicable.

FIG. 7 is a table showing an example of a file structure of the recording file. As shown in FIG. 7, in addition to usual accompanying information, such as photographing information, photographing conditions, and photographing date and time, the table of the cutout centers, the cutout sizes, and the lens distortion correction parameters (including the calculation formula) for respective zoom positions shown in the table in FIG. 4, 3D moving image thumbnails (right and left reduced-size images of a 3D still image representing a 3D moving image), and the parallax amount adjustment values H-SHIFT of respective thumbnails are recorded on the tag of the recording file. In addition, for each second, the parallax amount adjustment value H-SHIFT of a 3D moving image, a packet of information of the zoom position ZPx (packet for each frame in one second), reduced-size 3D moving images (for example, time-series right and left parallax images for 60 frames), and audio data for one second are recorded on the body of the recording file.

On the body of the recording file, information, such as the 3D moving image for the above-described one second, is continuously recorded only for arbitrary moving image photographing time.

Referring back to FIG. 3, the CPU 32 determines whether or not an instruction to terminate photographing a 3D moving image has been issued at step S32. For example, when the shutter button 11 is fully pressed again after the shutter button 11 is fully pressed, the CPU 32 determines "a photographing termination instruction has been issued".

Then, if "a photographing termination instruction has been issued" is not determined (if it is "NO"), the process returns to step S10, and repeats photographing and recording of the 3D moving image.

On the other hand, if "a photographing termination instruction has been issued" is determined (if it is "YES"), the process proceeds to step S32, where the 3D moving image for less than one second and the like are recorded, and then the photographing recording of the 3D moving image is terminated.

[Operation at a Reproducing Time of a 3D Moving Image]

Next, the operation at a reproducing time of a 3D moving image of the stereoscopic imaging device 10 according to the present disclosed subject matter will be described with reference to a flowchart shown in FIG. 8.

When a reproduction mode is set by the operation switch 18D doubling as the MENU/OK button and the reproduction button, the stereoscopic imaging device 10 can perform reproduction of the image recorded in the memory card 40.

Figure 8:
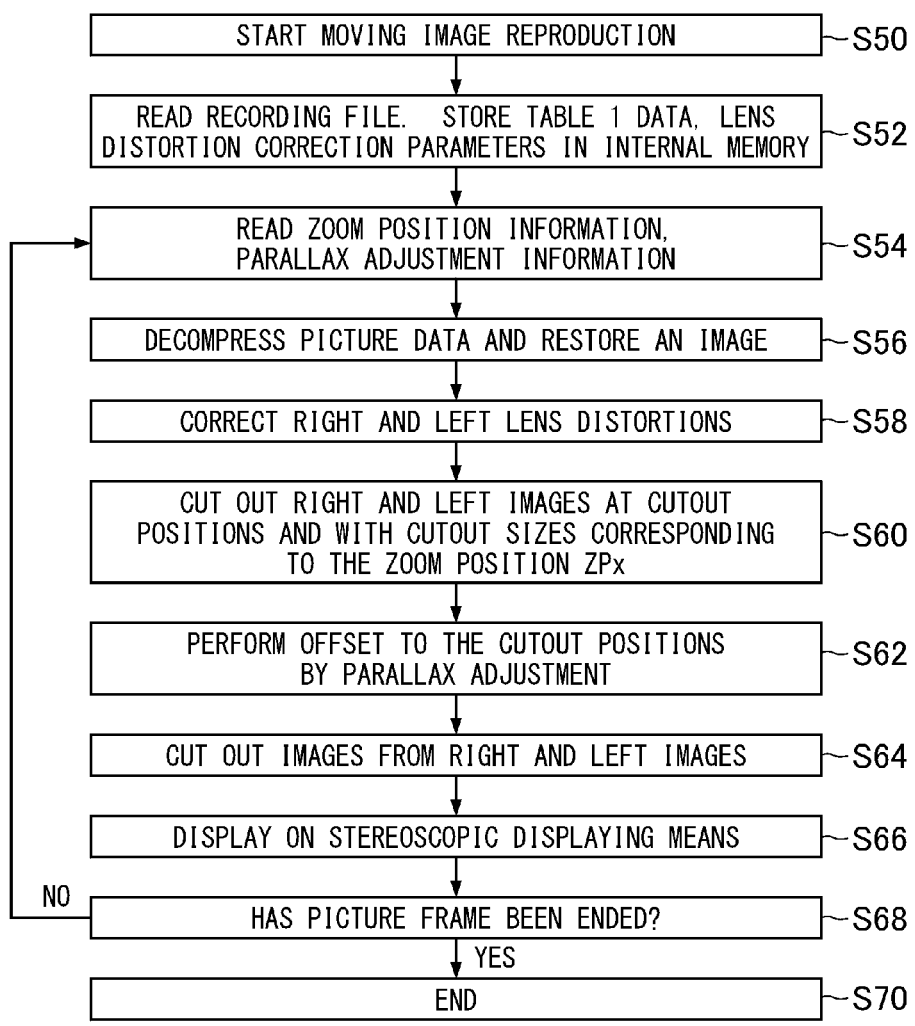
FIG. 8 is a flowchart showing the operation at a reproducing time of a 3D moving image of the stereoscopic imaging device according to the present disclosed subject matter.

In FIG. 8, if the recording file in which the 3D moving image has been recorded is selected and reproduction of the image is instructed (step S50), the CPU 32 reads out the data of the table shown in FIG. 4 based on the tag of the recording file (see FIG. 7), and records the data in the internal memory (RAM54) (step S52).

Next, the CPU 32 reads out the 3D moving image, an the zoom position ZPx and the parallax amount adjustment value H-SHIFT recorded in associated with the 3D moving image from the body of the recording file (step S54).

The read 3D moving image (compressed YC signal) is decompressed by the compression/decompression processing unit 42, restored to the uncompressed YC signal (step S56), and thereafter subjected to image processing by the second image processing unit of the digital signal processing unit 44 (step S58 to S64).

That is, the restored YC signal is first subjected to lens distortion corrections of the right and left viewpoint images by the lens distortion correction processing circuit. In this lens distortion correction processing, a parallax image whose lens distortion has been corrected is obtained by reading out corresponding lens distortion correction parameter and coordinates of cutout center (optical axis center) from the table shown in FIG. 4 stored in the RAM 54 based on the zoom position ZPx recorded corresponding to each frame, acquiring new coordinate values by substituting coordinate values based on the optical axis center of each pixel of the view point image into a calculation formula using this lens distortion correction parameter as a coefficient, and moving the pixel to the coordinate values (step S58, see FIGS. 5 and 6).

From the right and left parallax images having the full angle of view after lens distortion correction, their respective cutout areas are adjusted and cut out by the image cutout processing circuit so that deviations of the optical axes of the right and left photographing optical systems is corrected. That is, the image cutout processing circuit reads out the information of the coordinates of the cutout center (optical axis center) and the cutout size from the RAM 54 corresponding to the zoom position ZPx of the parallax image having the full angle of view, and, based on these information, cuts out right and left parallax images for 3D display after optical axis deviation correction from the right and left parallax images each having the full angle of view (steps S60).

Figure 9A:
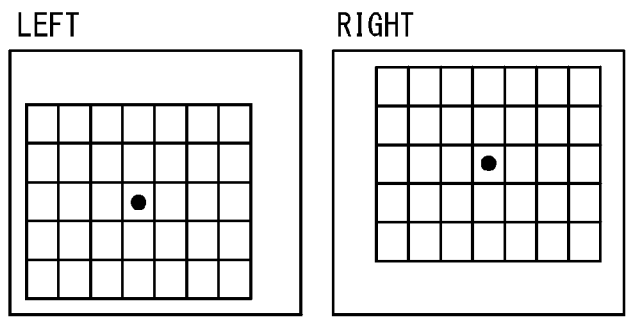
FIG. 9A is a diagram illustrating image cutout for correcting optical axis deviations or the like of the right and left photographing optical systems (Part 1)
Figure 9B:
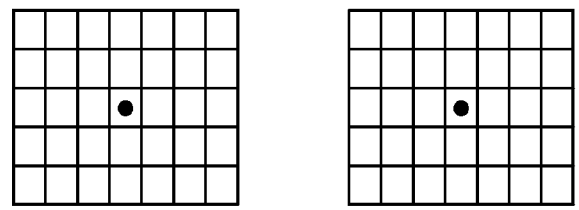
FIG. 9B is a diagram illustrating image cutout for correcting optical axis deviations or the like of the right and left photographing optical systems (Part 2)

From right and left parallax images each having the full angle of view after lens distortion correction shown in FIG. 9A, right and left parallax images after optical axis deviation correction is cut out, as shown in FIG. 9B.

Figure 9C:
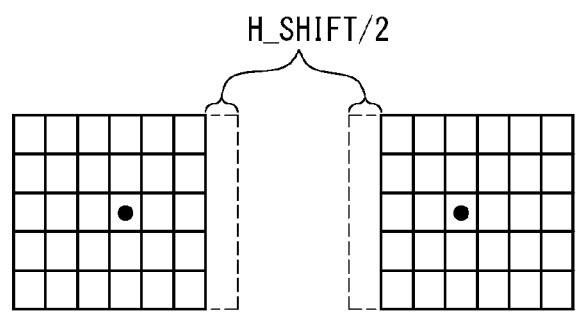
FIG. 9C is a diagram illustrating image cutout for correcting optical axis deviations or the like of the right and left photographing optical systems (Part 3)

Next, based on the parallax amount adjustment value H-SHIFT read at step S54, from the cutout right and left parallax images, the image cutout processing circuit cuts out cutout areas offset by one half the parallax amount adjustment value H-SHIFT in lateral directions, as shown in FIG. 9C (steps S62, S64). It should be noted that in the example shown in FIG. 9C, the cutout areas are cut out in directions of increasing in parallax amount, but in a case where the sign of the parallax amount adjustment value H-SHIFT is reversed, the cutout areas are cutout in directions of decreasing in parallax amount.

The right and left parallax images thus cut out are outputted to the liquid crystal display monitor 16 (stereoscopic display unit) through the display control unit 36, and displayed on the liquid crystal display monitor 16 as a 3D image (step S66).

At step S68, it is determined whether or not a picture frame is terminated or whether or not an instruction to terminate reproduction of a moving image is issued, and if it is "NO, the process returns to step S54.

Thus, the above reproduction processing is repeated for respective frames, and a 3D moving image is displayed on the liquid crystal display monitor 16. It should be noted that the destination of output of the 3D moving image is not limited to the liquid crystal display monitor 16, and the destination may be an external 3D display device.

If the picture frame is terminated or an instruction to terminate reproduction of a moving image is issued (if it is "YES"), the processing for reproducing a 3D moving image is terminated (step S70).

In the image cutout processing of the above embodiment, images are cut out in order to correct an optical axis deviation, and then, from the cutout images, parallax-adjusted images are cut out based on the parallax adjustment value H-SHIFT, but the image cutout processing is not limited to this, and the image cutout processing may be performed such that the respective coordinates of the cutout centers of the right and left parallax images are offset by one half the parallax adjustment value H-SHIFT, and according to the offset cutout centers and the cutout sizes, images are cut out simultaneously from the images each having the full angle of view.

Alternatively, the image cutout processing may be performed such that after images are cut out in order to correct an optical axis deviation, the cutout images are parallax-adjusted (the images are shifted) based on the parallax adjustment value H-SHIFT. When an image is stereoscopically displayed, the right and left ends of a displayed image may be blacked out by H-SHIFT/2. Or, of course, the ends may be displayed without being blacked out.

[Conversion Processing for 3D Moving Image]

Next, conversion processing for a 3D moving image of the stereoscopic imaging device 10 according to the present disclosed subject matter will be described with reference to a flowchart shown in FIG. 10. It should be noted that steps common with the flowchart shown in FIG. 8 will be denoted by common step numbers so that the details of the steps will be omitted.

Figure 10:
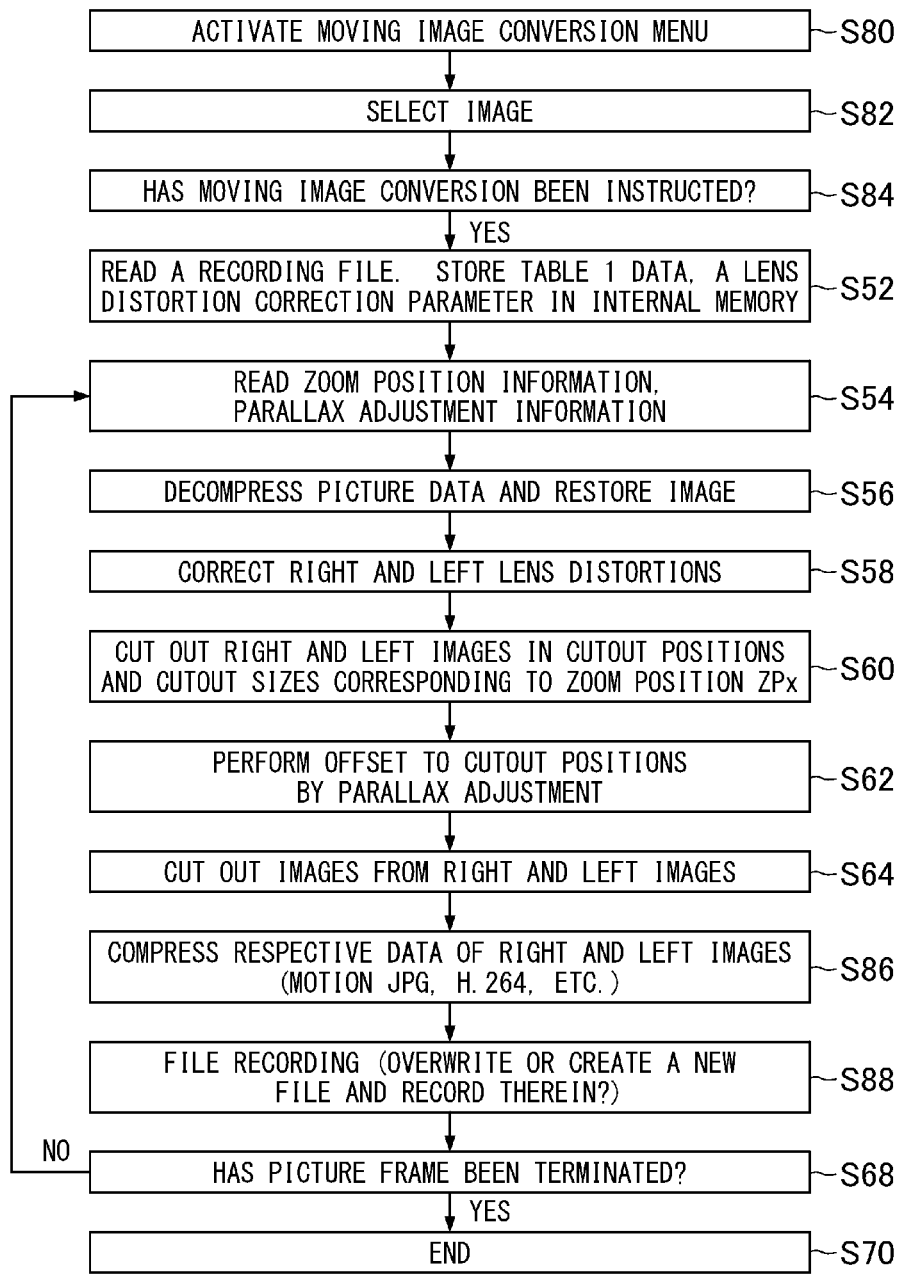
FIG. 10 is a flowchart showing 3D moving image conversion processing performed by the stereoscopic imaging device according to the present disclosed subject matter.

In FIG. 10, first, when a moving image conversion menu is displayed on the liquid crystal display monitor 16 and the moving image conversion menu is selected and executed by operating the operation switch 18D (MENU/OK button) of the stereoscopic imaging device 10, the conversion processing of a 3D moving image is started (step S80).

At step S82, a 3D moving image to be subjected to the conversion processing is selected. This selection of a 3D moving image can be performed by displaying thumbnails of 3D moving images and selecting a desired thumbnail. It should be noted that by displaying a pre-converted thumbnail and a converted thumbnail such that both the thumbnails are distinguishable from each other by a marker, a letter, or the like, a converted 3D moving can be prevented from being selected.

When an instruction to convert the selected 3D moving image has been issued, the selected 3D moving image is subjected to the lens distortion correction processing, the image cutout processing for correcting an optical axis deviation, or the like one frame by one frame at steps S52 to S64.

When the image processing for a specified number of frames for one second is terminated, the right and left parallax images are compressed, respectively (step S86), and are overwritten on the recording file or are stored in a new recording file created (step S88).

Then, until the picture frames are terminated, the process repeats steps S54 to S88. Thus, the recording file of the converted 3D moving image whose lens distortion, optical axis deviation, and the like have been corrected can be created.

[Others]

In this embodiment, the stereoscopic imaging device 10 performs the 3D moving image reproduction processing shown in FIG. 8, but this is not a limitation, and a 3D reproducer having a 3D display may perform the 3D moving image reproduction processing shown in FIG. 8. In this case, the 3D reproducer acquires the recording file of the 3D moving image recorded by the stereoscopic imaging device 10 from a recording medium directly or through a communication means.

In addition, in this embodiment, the stereoscopic imaging device 10 performs the 3D moving image conversion processing shown in FIG. 10, but this is not a limitation, and a personal computer or another external device installed with editing software that performs the 3D moving image conversion processing shown in FIG. 10 may perform the 3D moving image conversion processing on an inputted unprocessed 3D moving image.

In this embodiment, information of the coordinates of the cutout center and the cutout size of an image after lens distortion correction is stored and held as information for correcting deviation of an optical axis center, but this is not a limitation, and information of the coordinates of the cutout center and the cutout size of an image before lens distortion correction may be stored and held. In this case, first, based on the stored and held information, an image is cutout from an image before lens distortion correction in order to correct an optical axis deviation, and thereafter the processing for correcting lens distortion is performed on the cutout image.

In addition, in this embodiment, information of the coordinates of the cutout center (optical axis center) and the cutout size corresponding to the zoom position ZPx is held as information for correcting deviation of an optical axis center, as shown in FIG. 4, but this is not a limitation, and the coordinates of opposing corners of the cutout area may be held.

In addition, the present disclosed subject matter is applicable not only to lens distortion correction of a photographing optical system but also to correction of another aberration, such as chromatic aberration.

Furthermore, as shown in FIG. 7, the table shown in FIG. 4 is stored in the tag of the recording file so that the information of the zoom position ZPx is recorded in association with the frame of each moving image, but this is not a limitation, and data selected from the table shown in FIG. 4 based on the zoom position ZPx may be recorded directly in association with the frame of a moving image. In this case, it becomes unnecessary to record the information of the zoom position ZPx of the table shown in FIG. 4.

In addition, the present disclosed subject matter is not limited to the embodiments described above, and, of course, various modifications can be made without departing from the scope of the present disclosed subject matter.

REFERENCE SIGNS LIST

10 . . . stereoscopic imaging device, 11 . . . shutter button, 12 . . . zoom button, 16 . . . liquid crystal display monitor, 20-1, 20-2 . . . imaging unit, 21 . . . focus lens and zoom lens, 24 . . . CCD, 25 . . . analog signal processing unit, 32 . . . central processing unit (CPU), 34 . . . operation unit, 44 . . . digital signal processing unit, 54 . . . RAM, 56 . . . ROM, 58 . . . EEPROM

The invention claimed is:

1. A stereoscopic imaging device comprising:
a plurality of imaging units each having a photographing optical system and an imaging device which photoelectrically converts an object image focused through the photographing optical system, the plurality of imaging units imaging parallax images having a parallax with respect to each other;
a storage unit preliminarily storing first and second information regarding optical axes deviation between photographing optical axes peculiar to the stereoscopic imaging device before shipment, the first information indicating a central position of an optical axis for cutting out an image from a photographing field regarding each photographing optical system and a cutout size, or a cutout area centering on the central position of an optical axis of each photographing optical system, and second information indicating an aberration of each photographing optical system;
an imaging control unit causing the plurality of imaging units to output a plurality of time-series parallax images forming a stereoscopic moving image; and
a recording unit recording the plurality of time-series parallax images outputted from the plurality of imaging units on a recording medium when the moving image is photographed, reading out the first and second information from the storage unit, and recording the first information and the second information read out from the storage unit on the recording medium in association with the plurality of parallax images.

2. The stereoscopic imaging device according to claim 1, wherein the first information is information on the parallax images before the aberrations of the photographing optical systems are corrected or the parallax images after the aberrations have been corrected.

3. The stereoscopic imaging device according to claim 1, further comprising a parallax amount adjustment unit outputting an instruction of adjusting parallax amounts among the plurality of parallax images outputted from the plurality of imaging units, wherein
the recording unit records, as third information, parallax adjusting amounts based on the instruction outputted from the parallax amount adjustment unit on the recording medium in association with the plurality of parallax images.

4. The stereoscopic imaging device according to claim 3, further comprising:
a readout unit reading out the plurality of time-series parallax images, and the first information, the second information, and the third information from the recording medium;
an image processing unit adjusting the first information by changing at least one of the central position of the optical axis indicated by the first information, the cutout area, and the cutout size, based on the third information, cutting out the plurality of readout time-series parallax images for stereoscopic display based on the adjusted first information, and creating a plurality of time-series parallax images after aberration correction based on the readout second information; and
an output unit outputting the plurality of time-series parallax images created by the image processing unit to a stereoscopic display unit in the stereoscopic imaging device or an external stereoscopic display unit.

5. The stereoscopic imaging device according to claim 3, further comprising:
- a readout unit reading out the plurality of time-series parallax images and the first information, the second information, and the third information from the recording medium;
- an image processing unit cutting out the plurality of readout time-series parallax images for stereoscopic display based on the readout first information, and creating a plurality of time-series parallax images after aberration correction based on the readout second information; and
- an output unit after shifting the plurality of time-series parallax images created by the image processing unit based on the third information, outputting the plurality of shifted time-series parallax images to a stereoscopic display unit in the stereoscopic imaging device or an external stereoscopic display unit.

6. The stereoscopic imaging device according to claim 1, further comprising a photographing information acquiring unit acquiring time-series information indicating a zoom position of the zoom lens when the moving image is photographed, wherein
- the photographing optical system is a zoom lens,
- the storage unit stores the first information and the second information for respective zoom positions of the zoom lens, and
- the recording unit records, on the recording medium in association with the plurality of parallax images, all information of the first information and the second information for the respective zoom positions stored in the storage unit and information indicating a time-series zoom position of the zoom lens when a moving image is photographed, or time-series pieces of the first information and the second information read out from the storage unit based on information indicating the zoom position of the zoom lens when a moving image is photographed.

7. The stereoscopic imaging device according to claim 1, further comprising:
- a readout unit reading out the plurality of time-series parallax images, and the first information and the second information from the recording medium;
- an image processing unit cutting out the plurality of readout time-series parallax images for stereoscopic display based on the readout first information, and creating a plurality of time-series parallax images after aberration correction based on the readout second information; and
- an output unit outputting the plurality of time-series parallax images created by the image processing unit to a stereoscopic display unit in the stereoscopic imaging device or an external stereoscopic display unit.

8. The stereoscopic imaging device according to claim 7, further comprising, instead of the outputting unit, or in addition to the outputting unit, a recording unit recording, on the recording medium, the plurality of time-series parallax images created by the image processing unit.

9. An image reproducing device comprising:
- a readout unit reading out the plurality of time-series parallax images, and the first information and the second information from the recording medium recorded by the stereoscopic imaging device according to claim 1; an image processing unit cutting out the plurality of readout time-series parallax images for stereoscopic display based on the readout first information, and creating a plurality of time-series parallax images after aberration correction based on the readout second information; and
- a stereoscopic display unit displaying a stereoscopic moving image based on the plurality of time-series parallax images created by the image processing unit.

10. An image reproducing device comprising:
- a readout unit reading out the plurality of time-series parallax images, and the first information, the second information, and the third information from the recording medium recorded by the stereoscopic imaging device according to claim 3;
- an image processing unit adjusting the first information by changing at least one of the central position of the optical axis indicated by the first information, the cutout area, and the cutout size, based on the third information, cutting out the plurality of readout time-series parallax images for stereoscopic display based on the adjusted first information, and creating a plurality of time-series parallax images after aberration correction based on the readout second information; and
- a stereoscopic display unit displaying a stereoscopic moving image based on the plurality of time-series parallax images created by the image processing unit.

11. An image reproducing device comprising:
- a readout unit reading out the plurality of time-series parallax images and the first information, the second information, and the third information from the recording medium recorded by the stereoscopic imaging device according to claim 3;
- an image processing unit cutting out the plurality of readout time-series parallax images for stereoscopic display based on the readout first information, and creating a plurality of time-series parallax images after aberration correction based on the readout second information; and
- a stereoscopic display unit after shifting the plurality of time-series parallax images created by the image processing unit based on the third information, displaying a stereoscopic moving image.

12. A non-transitory computer-readable tangible recording medium recording an editing software causing a computer to realize:
- a readout function of reading out the plurality of time-series parallax images and the first information and the second information from the recording medium recorded by the stereoscopic imaging device according to claim 1;
- an image processing function of cutting out the plurality of readout time-series parallax images for stereoscopic display based on the readout first information, and creating a plurality of time-series parallax images after aberration correction based on the readout second information; and
- a recording function of recording the plurality of created time-series parallax images on the recording medium.

13. A non-transitory computer-readable tangible medium recording an editing software causing a computer to realize:
- a readout function of reading out the plurality of time-series parallax images, and the first information, the second information, and the third information from the recording medium recorded by the stereoscopic imaging device according to claim 3;
- an image processing function of adjusting the first information by changing at least one of the central position of the optical axis indicated by the first information, the cutout area, and the cutout size, based on the third information, cutting out the plurality of readout time-series parallax images for stereoscopic display based on the adjusted first information, and creating a plurality of time-series parallax images after aberration correction based on the readout second information; and a recording function of recording the plurality of created time-series parallax images on the recording medium.

14. A non-transitory computer-readable tangible medium recording an editing software causing a computer to realize:
   a readout function of reading out the plurality of time-series parallax images, and the first information, the second information, and the third information from the recording medium recorded by the stereoscopic imaging device according to claim 3;
   an image processing function of cutting out the plurality of readout time-series parallax images for stereoscopic display based on the readout first information, and creating a plurality of time-series parallax images after aberration correction based on the readout second information; and
   an outputting function of after shifting the plurality of time-series parallax images created by the image processing unit based on the third information, outputting the plurality of shifted time-series parallax images to a stereoscopic display unit.

15. An editing method causing a computer to perform:
   a readout step of reading out the plurality of time-series parallax images and the first information and the second information from the recording medium recorded by the stereoscopic imaging device according to claim 1, 2, or 6;
   an image processing step of cutting out the plurality of readout time-series parallax images for stereoscopic display based on the readout first information, and creating a plurality of time-series parallax images after aberration correction based on the readout second information; and
   a recording step of recording the plurality of created time-series parallax images on the recording medium.

16. An editing method causing a computer to perform:
   a readout step of reading out the plurality of time-series parallax images, and the first information, the second information, and the third information from the recording medium recorded by the stereoscopic imaging device according to claim 3;
   an image processing step of adjusting the first information by changing at least one of the central position of the optical axis indicated by the first information, the cutout area, and the cutout size, based on the third information, cutting out the plurality of readout time-series parallax images for stereoscopic display based on the adjusted first information, and creating a plurality of time-series parallax images after aberration correction based on the readout second information; and
   a recording step of recording the plurality of created time-series parallax images on the recording medium.

17. An editing method causing a computer to perform:
   a readout step of reading out the plurality of time-series parallax images, and the first information, the second information, and the third information from the recording medium recorded by the stereoscopic imaging device according to claim 3;
   an image processing step of cutting out the plurality of readout time-series parallax images for stereoscopic display based on the readout first information, and creating a plurality of time-series parallax images after aberration correction based on the readout second information; and
   an outputting step of after shifting the plurality of time-series parallax images created by the image processing unit based on the third information, outputting the plurality of shifted time-series parallax images to a stereoscopic display unit.

* * * * *